(12) United States Patent
Shaffer

(10) Patent No.: US 8,602,371 B2
(45) Date of Patent: *Dec. 10, 2013

(54) COMPOUND DIFFERENTIAL THREAD SYSTEMS

(71) Applicant: Twin Turbine Technologies LLC, Boise, ID (US)

(72) Inventor: James E. Shaffer, Boise, ID (US)

(73) Assignee: Twin Turbine Technologies LLC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,062

(22) Filed: Oct. 12, 2012

(65) Prior Publication Data
US 2013/0042707 A1  Feb. 21, 2013

Related U.S. Application Data

(62) Division of application No. 12/553,913, filed on Sep. 3, 2009, now Pat. No. 8,292,243.

(51) Int. Cl.
*A47B 96/00* (2006.01)

(52) U.S. Cl.
USPC ........... 248/222.14; 403/43; 403/47; 411/413

(58) Field of Classification Search
USPC ................ 248/274.1, 292.12, 298.1, 297.31, 248/222.14; 403/43, 44, 47; 411/413, 373, 411/431, 429, 433; 82/128; 29/896.7
See application file for complete search history.

(56) References Cited

U.S. PATENT DOCUMENTS

| | | | | |
|---|---|---|---|---|
| 4,571,936 A * | 2/1986 | Nash et al. | ...................... | 60/797 |
| 5,309,801 A * | 5/1994 | Markle | ......................... | 82/128 |
| 6,135,691 A | 10/2000 | Nadarajah et al. | | |
| 6,263,572 B1 | 7/2001 | Hattan | | |
| 6,497,528 B2 * | 12/2002 | Hattan | ............................ | 403/43 |
| 8,292,243 B2 * | 10/2012 | Shaffer | .................... | 248/222.14 |
| 2002/0116821 A1 * | 8/2002 | Hattan | ......................... | 29/896.7 |

* cited by examiner

*Primary Examiner* — Todd M. Epps
(74) *Attorney, Agent, or Firm* — Buchanan Nipper

(57) ABSTRACT

A compound differentially threaded element engages two or more longitudinally severed segments of a mating threaded element to provide differential linear motion. Different thread types may include pitch, thread starts, handedness or threadform. Combinations of differential threads may be selected to enable fine or coarse linear motion without correspondingly fine or coarse thread pitches.

12 Claims, 13 Drawing Sheets

COMPOUND DIFFERENTIAL THREAD SYSTEMS

PRIORITY/CROSS-REFERENCE TO RELATED APPLICATIONS

This application is a divisional of application Ser. No. 12/553,913, filed on Sep. 3, 2009, which was a non-provisional of, and claims the priority date of the provisional application entitled Compound Differential Thread Systems filed on Sep. 3, 2008, with application Ser. No. 61/093,719 the disclosures of which are incorporated herein by reference.

FIELD OF THE INVENTION

The invention generally relates to an apparatus employing outside threads on shafts and inside threads on holes (nuts), and more particularly to systems that employ different types of threads on the same area of the shaft or hole.

BACKGROUND OF THE INVENTION

The medieval wine press uses a threaded shaft to apply pressure to a piston. As the operator turns the shaft, the shaft engages threads in the frame of the wine press applying pressure to an axially guided (by grooves) generally non-rotating piston. As the piston moves down under the force of the screw, it crushes grapes in a container liberating the juice.

Leonardo da Vinci introduced an improved wine press that uses two sets of screw threads on a shaft. Da Vinci's invention is characterized by a common shaft with two different outside thread pitches. A first set of outside threads is of a coarser pitch and is employed at one end of the shaft. This first set of threads conjugately engage with internal threads in the press frame. A second finer pitch of outside threads is employed near the opposite end of the shaft and conjugately engage with internal threads in the piston. Grooves in the frame, generally parallel with the subject shaft, prevent the axially moving piston from rotating. When the shaft is turned in the frame threads, it moves in a generally helical manner along the shaft axis. The helically turning shaft is simultaneously operating in the threads located in the generally non-rotating piston. Because the thread operating in the piston is of a finer pitch while being of the same handedness as the threads in the frame, the piston will be caused to axially retreat on the helically advancing shaft at a rate not quite as fast as the shaft itself is axially advancing. The net linear effect of the piston's axial motion is substantially finer than that of the shaft itself. Consequently, the thrust of the piston is substantially increased over the thrust of the shaft alone.

In da Vinci's time, it was very difficult to hold tight tolerances in machining processes. It was therefore difficult to manufacture even the coarsest of helical threads. To achieve the effect of a thread fine enough to relieve the substantial torque production required by the average person, Leonardo da Vinci introduced an improved wine press that used two sets same handedness screw threads tandemly deployed and each with a different pitch so as to effect the net result of a thread too fine for the machining capabilities in the 15$^{th}$ century. Today, we have even greater need for finer and finer threads. Frequently, such threads exceed the capabilities even of today's precise machine tools. In some cases, it is required to devise not finer threads but threads that provide high-speed axial advance in a more efficient manner than the use of very course or threads of multiple starts. Where this is the case, two threads different by means of opposite handedness may be involved.

U.S. Pat. Nos. 6,263,572 and 6,497,528 by Hattan disclose a turnbuckle using shafts or portions of shafts with outside threads. The threads on the shafts are the same except that one thread is right handed while the other thread is left handed. A common nut has both internal right-handed and left-handed threads cut into it. The threaded shafts are captured in the nut and pass axially over each other as the nut is turned. This approach only operates when the threaded components are non-rotated by devices not shown or specified in said patents.

SUMMARY OF THE INVENTION

The embodiments employ threads of differing pitch, handedness, thread-form, and/or number of thread starts or even non-helical threads on the same area of a shaft or hole. An arrangement of differing threads, combined in the same area is referred to as compounded differential threads, abbreviated "CDT". CDTs can be internal or external threads. Internal threads are formed on the inside of a hole, for example in a nut, while external threads are formed on a shaft.

When two shafts of differing threads pass together in a compound differential thread (CDT) nut, the cross-section of the shafts are some fraction of a whole circle. For example, two shafts may be half circles (180 degrees) in cross section, while three shafts could each be one third of a circle (120 degrees). There is no need however, for the shafts to be of equal cross section or thread contact length. Shafts that are split along or adjacent to their axis are called longitudinally severed segment shafts or LSS shafts.

In one embodiment, internal compound differential threads (CDT) in a nut enable longitudinally severed segment (LSS) shafts of differing thread type to move axially at different rates as the nut is turned, while the LSS shafts are limited in rotation.

In another embodiment, external compound differential threads (CDT) on a shaft enable differing internal thread types on longitudinally severed segment (LSS) nuts to move axially at different rates as the shaft is turned, while the LSS nuts are limited in rotation.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention.

DESCRIPTION OF THE PREFERRED EMBODIMENTS

Figure 1:
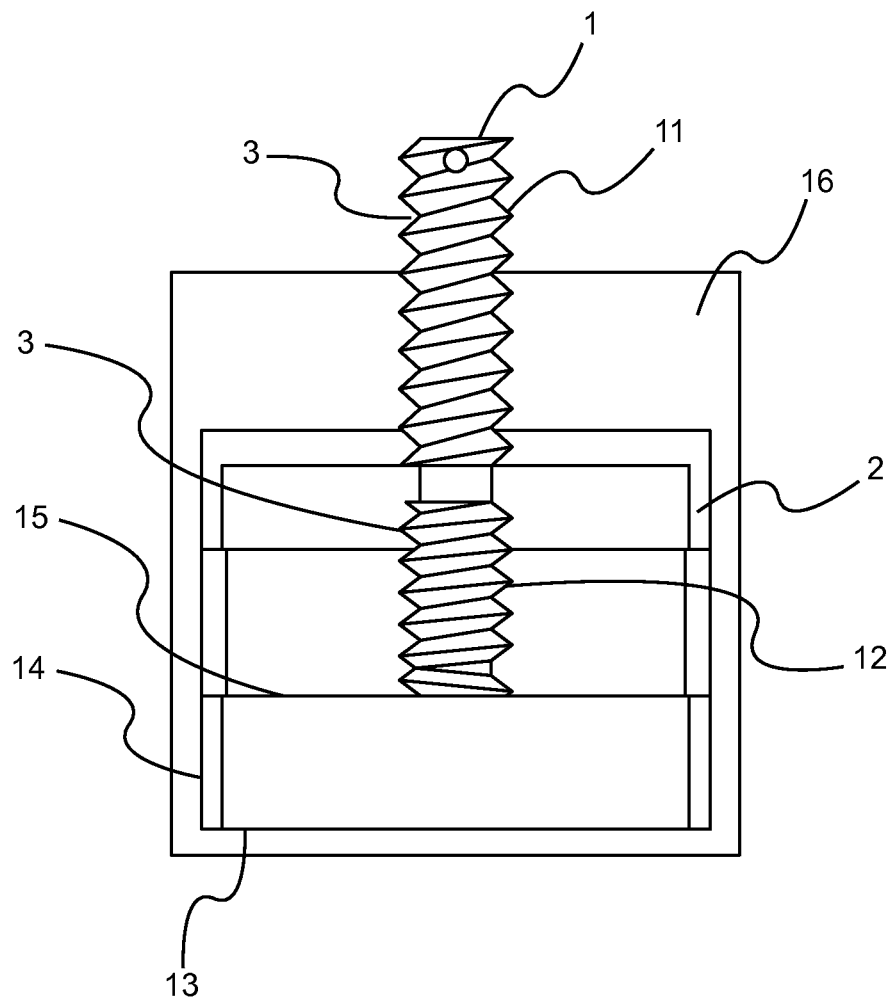
FIG. 1 shows an example of the da Vinci wine press screw.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "e.g.", "etc", and or indicates non-exclusive alternatives without limitation unless otherwise noted. The use of "including" means "including, but not limited to", unless otherwise noted.

FIG. 1 shows an example of the da Vinci wine press screw. A frame 16 contains a threaded hole which conjugately engages upper screw 11. A piston 15 contains a threaded hole which conjugately engages a finer pitched thread 12. As the operator twists the turning handle 17, the external threads 11 and 12 engage the conjugate internal threads in the frame 16 and piston 15 forcing the piston 15 into the container 13. Grooved slides 14 limit rotation of the piston 15 with respect to the frame 16. As the operator turns the handle, the shaft advances downward toward the container 13. The piston 15 advances upward away from the container 13 but at a slower rate. The combined effect of these two motions is to advance the piston 15 into the container 13 at slower rate than could be achieved by either set of threads alone. By employing threads 11 and 12 of differing pitches, the press of FIG. 1 achieves a mechanical advantage unobtainable in Leonardo's day with one thread pitch alone.

Note, however, that the press of FIG. 1 requires that the different threads 11 and 12 must be located at different sections of the shaft. Additionally, the conjugate internal threads for 11 and 12 must be located in different locations.

Figure 2:
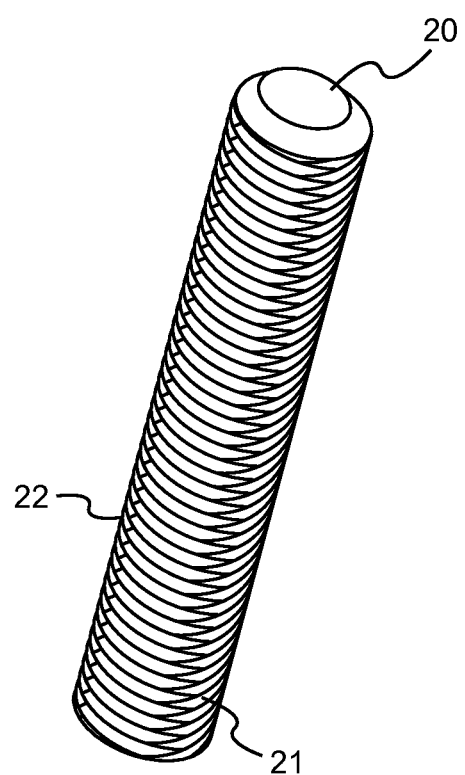
FIG. 2 shows one embodiment of a CDT shaft with different threads in the same area.

FIG. 2 is a view of one embodiment of an adjustment shaft 20 for use in the adjustment bracket of the invention, in which multiple thread paths (compound differential threads (CDT)) are located on a shaft. Two differing thread paths 21 and 22 exist in the same area along the shaft of FIG. 2. These threads can differ in a number of ways, including, but not limited to handedness (right hand or left hand), pitch, thread form or number of thread starts.

Figure 3:
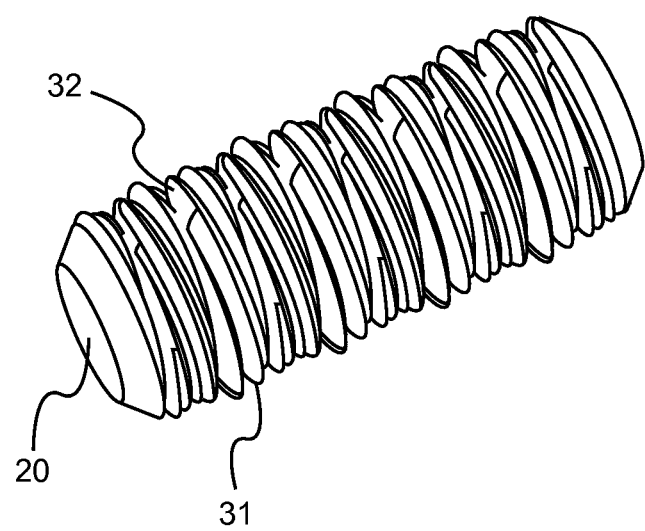
FIG. 3 shows one embodiment of a CDT shaft emphasizing the effect of over-running threads.

FIG. 3 shows a detailed view of an embodiment of the adjustment shaft of the invention where two threads of differing pitches exist on the same portion of a shaft. Thread 31 is of a coarser pitch while thread 32 is of a finer pitch. Both threads exist on the same shaft in the same location. This is another example of compound differential threads (CDT). The threads are together or compounded, while being of diverse kinds or differential. FIG. 3 also shows how the valley of one thread occasionally cuts the peak of the other thread. This effect called over-running can reduce the load capacity is some situations but does not prevent operation of either thread or conjugate internal threads (not shown).

Figure 4:
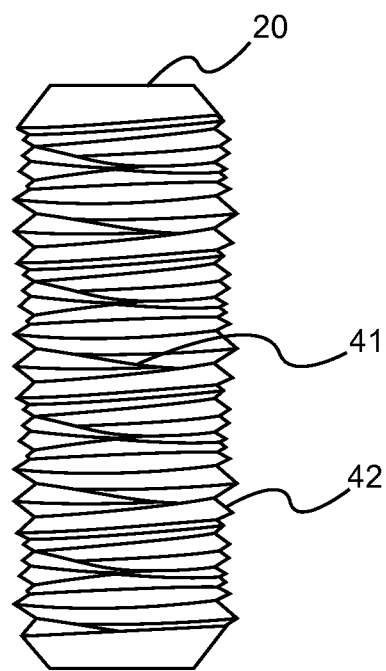
FIG. 4 is another example of a CDT shaft.

FIG. 4 shows an example of two compound differential threads 41 and 42 with the valley of thread 41 cutting across the peak of thread 42. This is the condition called over-running. In applications where strength is important, the effects of over-running can be compensated by increasing the number of thread engagements between the outside threads 41 and 42 and the conjugately engaging inside threads of a bracket or hole (not shown).

Figure 5:
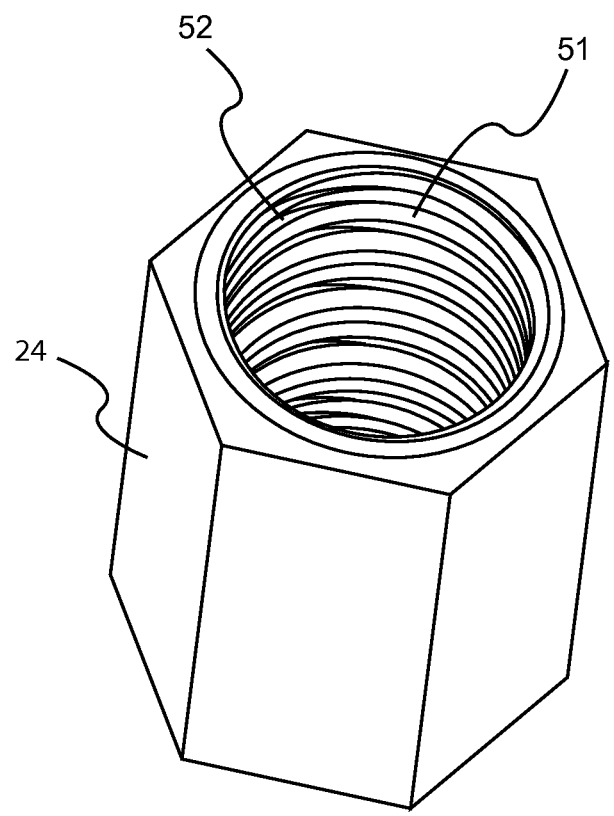
FIG. 5 shows one embodiment of a nut with internal compound differential threads (CDT).

FIG. 5 shows one embodiment of a compound differential (CDT) bracket, also referred to as an adjustment bracket 24. Within the bracket 24, two different types of inside threads 51 and 52 exist in the same bracket 24 in the same longitudinal location. Similar to the outside threads of FIGS. 2-4, the threads of FIG. 5 can differ in a number of ways, including, but not limited to, handedness (right hand or left hand), pitch, thread-form or number of thread starts. The inside threads of FIG. 5 also demonstrate over-running similar to the outside compound differential threads (CDT).

Figure 6:
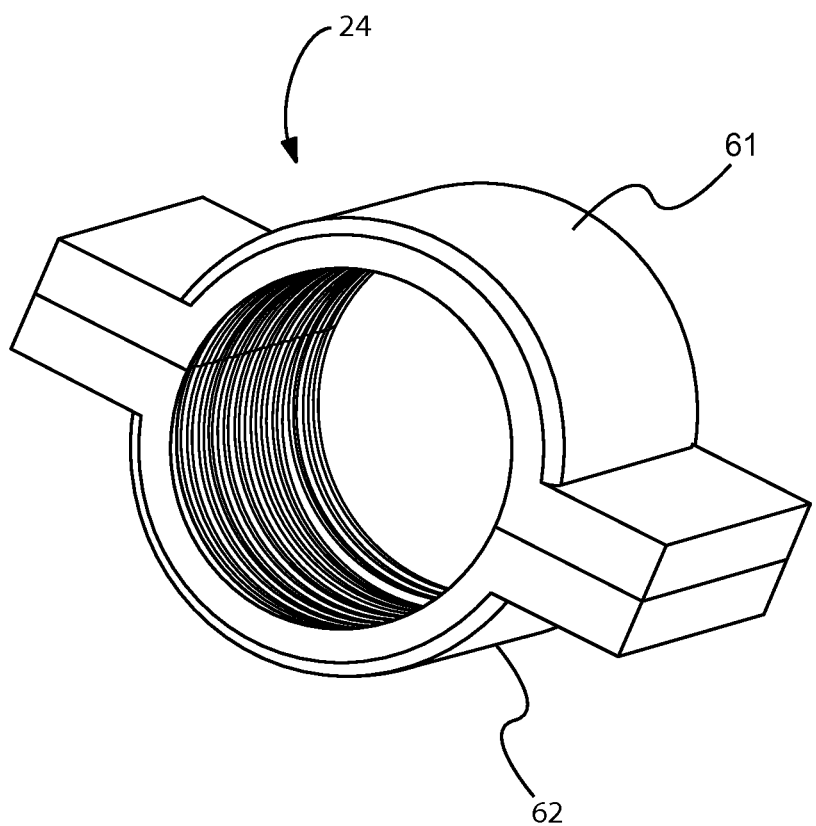
FIG. 6 shows one embodiment an LSS nut that is split along its longitudinal axis.

FIG. 6 is an embodiment of a bracket 24 which is split or severed along its axis, for a first bracket subunit and a second bracket subunit. This is an example of a longitudinally severed segment (LSS) nut (bracket) with internal threads. The bracket 24 of FIG. 6 has two halves or subunits 61 and 62. The two subunits each have a different type of internal threads. The two subunits 61 and 62 can fit around a CDT shaft 20 with each half conjugately engaging one of two different thread types on the CDT shaft. Note also that an LSS bracket 24 is easily assembled on a CDT shaft simply by placing each bracket 24 segment on the shaft in engagement with the conjugate threads. It is not required to turn the bracket 24 to thread it along the length of the shaft.

Figure 7:
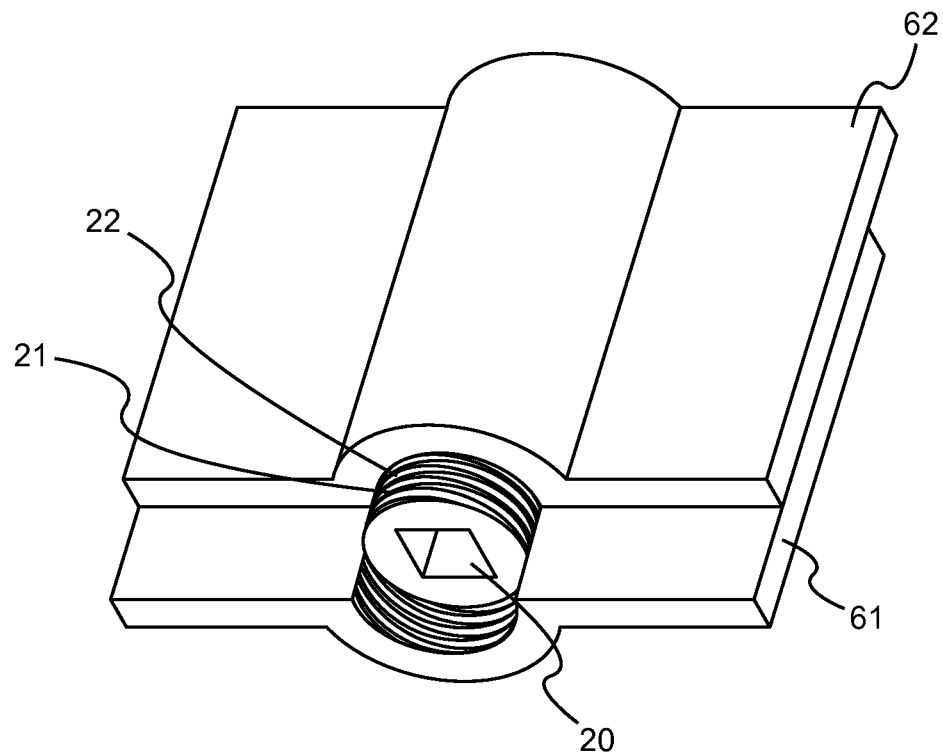
FIG. 7 shows one embodiment of two LSS nut halves capturing a CDT shaft.

FIG. 7 shows the two subunits of an LSS bracket 24 similar to FIG. 6 surrounding and conjugately engaging the threads of the CDT shaft of FIG. 2. In this embodiment the threads 21 on the CDT shaft conjugately engage the threads on the LSS bracket subunit 61, while the threads 22 of the CDT shaft conjugately engage the threads on the LSS subunit 62. As the shaft 20 is turned, but held stationary along its longitudinal axis, the two bracket subunits 61 and 62 move at different rates. If the two thread types differ by handedness, such as right hand and left hand, the LSS subunits 61 and 62, while restrained from rotation, will move in different directions as the CDT shaft 20 is turned. If the two thread types differ by pitch, the subunits 61 and 62 will move in the same direction but at different rates as the CDT shaft 20 is turned.

A numerical example demonstrates the benefit of a CDT shaft coupled with an LSS bracket 24. Suppose in FIG. 7, the conjugate threads 21 and 61 have a pitch of 20 threads per inch (TPI) while the conjugate threads 22 and 62 have a pitch of 25 threads per inch (TPI). With each turn of the shaft 20, LSS bracket 24 61 moves 1/20 or 0.050 inches. With each turn of the shaft 20, LSS bracket 62 moves 1/25 or 0.040 inches. If both sets of threads 21/61 and 22/62 are the same handedness, the brackets move in the same direction but at different rates. The difference is 0.050-0.040 or 0.010 inches per turn of the shaft 20. This differential movement is equivalent to a single thread (non-CDT, non-LSS) pitch of 100 threads per inch. A pitch of 100 threads per inch is more difficult to manufacture due to the fine pitch. Thus, the CDT-LSS combination offers several advantages especially in applications requiring precise motion.

Figure 8:
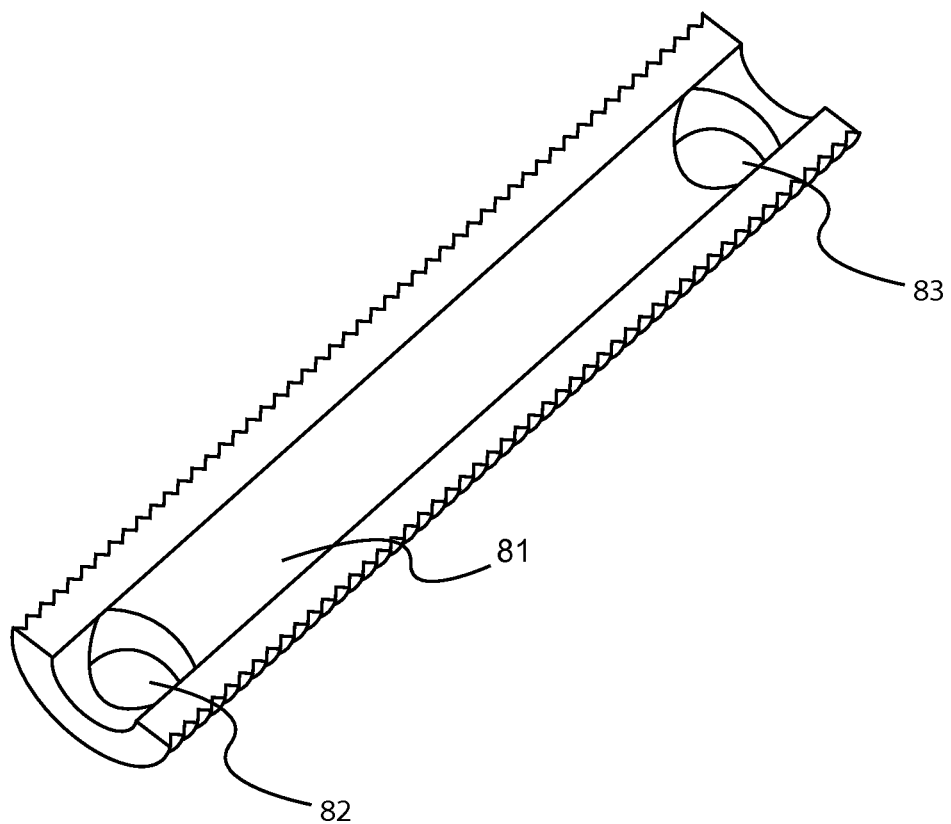
FIG. 8 shows one embodiment of a longitudinally severed segment (LSS) shaft with attachment points and a semi-circular axial relief as an access.

FIGS. 6 and 7 show an LSS bracket. FIG. 8 shows an embodiment of an adjustment shaft subunit, or LSS shaft. The LLS shaft 81 has outside threads and is in form of a half-pipe. Other embodiments include a half shaft where the center of the shaft 81 is solid. Attachment points 82 and 83 enable the connection of the shaft 81 to other devices (not shown). Another shaft of similar shape to shaft 81, but with differing threads can form a complete full circle shaft. The two LSS shafts can then be captured by a CDT bracket as will be shown in a following diagram. This, as well as FIGS. 9, 10, and 11, are examples of an adjustment shaft in which the different thread paths are on different subunits, and the threads do not completely circumvolve the shaft.

Figure 9:
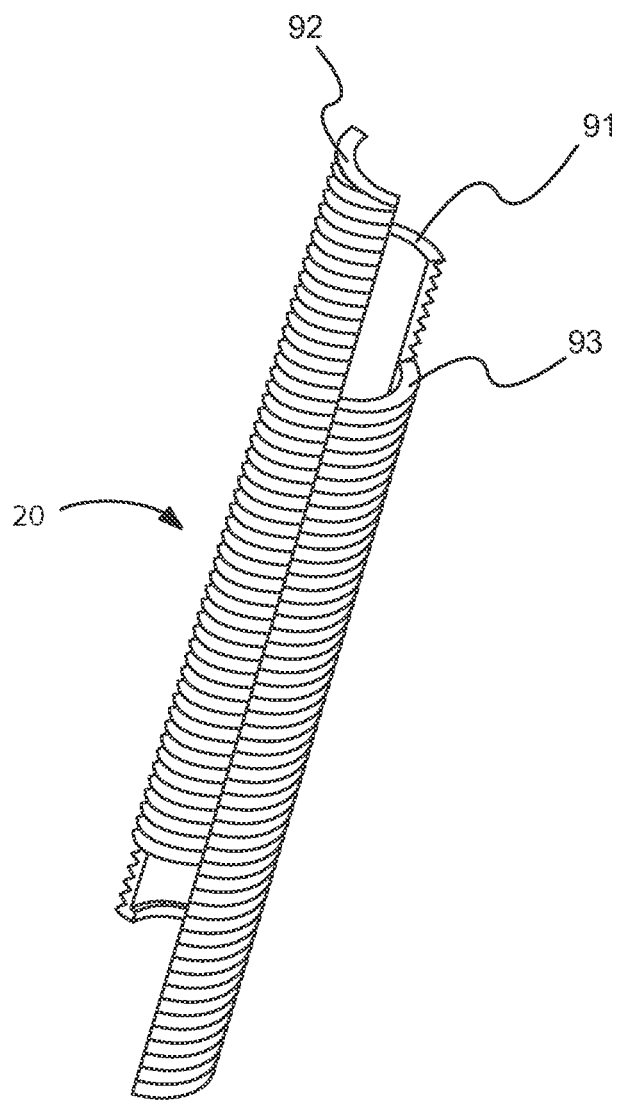
FIG. 9 shows one embodiment of three longitudinally severed segment (LSS) shafts arranged to fit into the hole of a CDT nut.

In FIG. 9 three LSS shaft subunits 91, 92, and 93 illustrate yet another embodiment. While the discussion of FIG. 8 suggested two LSS shafts, FIG. 9 shows how three LSS shafts can be put together. A CDT bracket 24 (not shown) with three thread types can surround, capture and conjugately engage with the different threads of LSS shafts 91, 92 and 93. When the CDT bracket is held stationary in the longitudinal axis, the three LSS shafts 91, 92 and 93 will move linearly at different rates so long as the LSS entities are prevented from rotating when the CDT bracket is turned.

Figure 10:
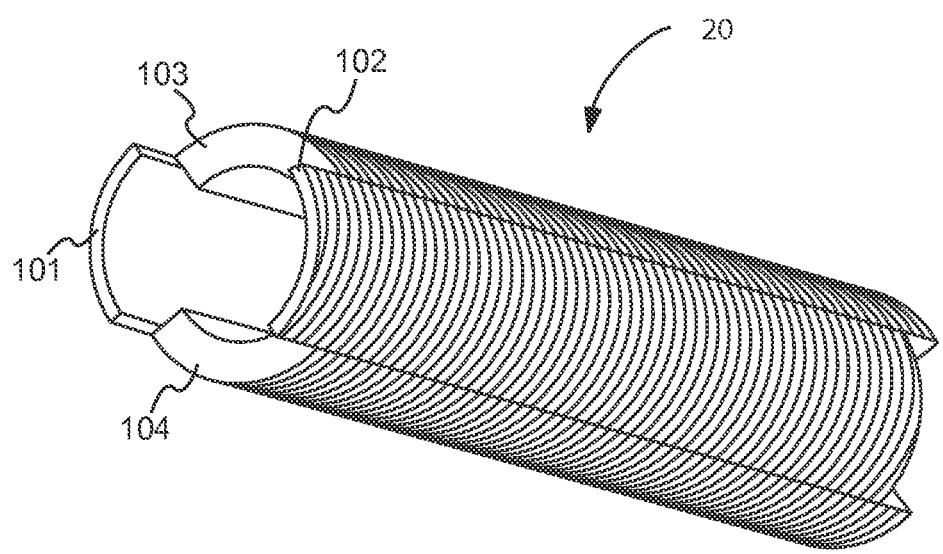
FIG. 10 shows one embodiment of four longitudinally severed segment (LSS) shafts arranged to fit into the hole of a CDT bracket.

FIG. 10 expands on the concepts of FIGS. 8 and 9 to show an embodiment of four LSS shaft subunits 101, 102, 103 and 104. In FIG. 10 the four LSS shafts can have four different thread types or a mix. An example of a mix is where LSS shafts 103 and 104 share a common thread type and a common helix while LSS shafts 101 and 102 share a different thread type and their own common helix. The corresponding CDT bracket (not shown) contains as many thread types as needed to conjugately engage all the thread types on the LSS shafts 101-104. The number of LSS shafts possible is conceivably unlimited.

Figure 11:
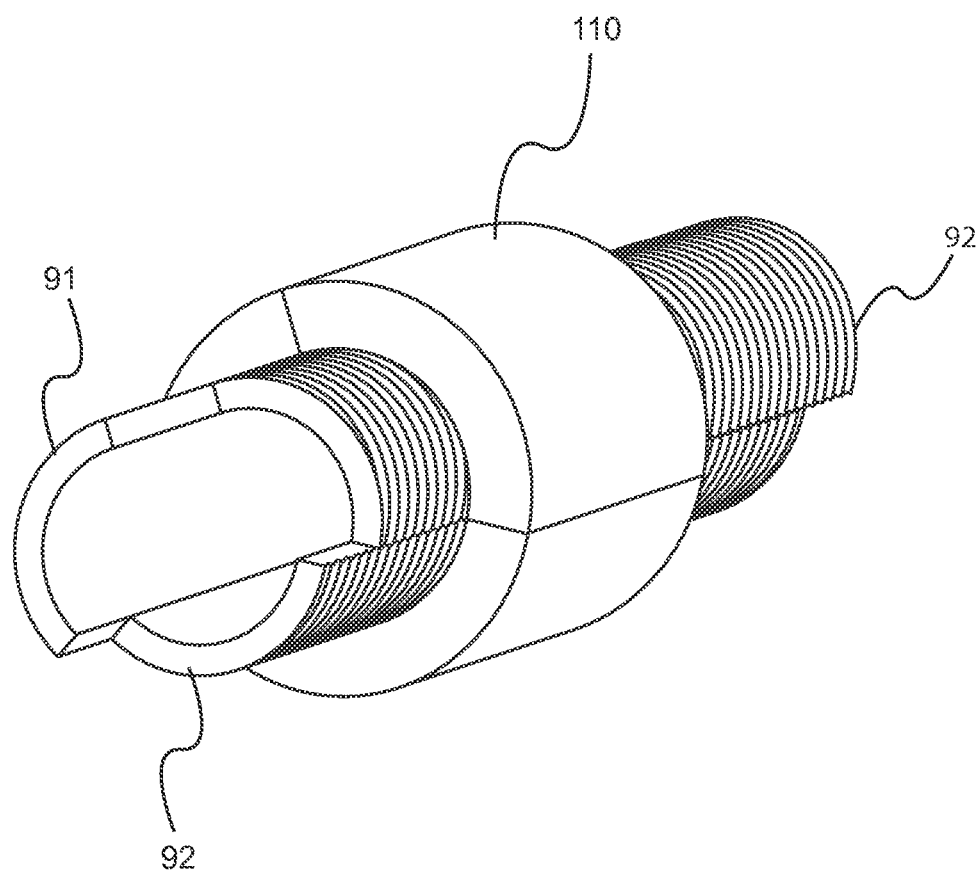
FIG. 11 shows one embodiment of a CDT nut capturing three LSS shafts.

FIG. 11 shows an embodiment where the three LSS shafts of FIG. 9 are captured by a CDT bracket 110. The CDT bracket 110 of FIG. 11 has three different overrunning internal threads to conjugately engage a corresponding thread on each of the LSS shafts 91, 92, and 93. Depending upon the thread handedness and pitch, the LSS shaft subunits 91-93 move at different axial rates and/or directions as the CDT bracket 110 is turned while the LSS entities are rotationally restrained. While the embodiment of FIG. 11 shows three LSS shafts, a person skilled in the related mechanical arts will recognize that many different numbers of LSS shafts and thread types are possible. The advantages of mixing thread pitches to achieve fine differential motion as discussed in FIG. 7 are also possible with the embodiment of FIG. 11.

In FIG. 11, the CDT bracket 110 is split into three sections. While not always required, this alternate embodiment of a split bracket enables rapid and easy assembly of LSS shafts with CDT brackets. Other embodiments include forming the bracket 110 as the rotor of a motor to form a linear actuator. As the rotor-bracket 110 rotates, the LSS shafts 9, 92, and 93 move in an axial manner. Still other embodiments (not shown) include fixed members between the LSS shafts to allow axial movement of the shafts 91, 92 and 93 while preventing rotation of the shafts.

Figure 12:
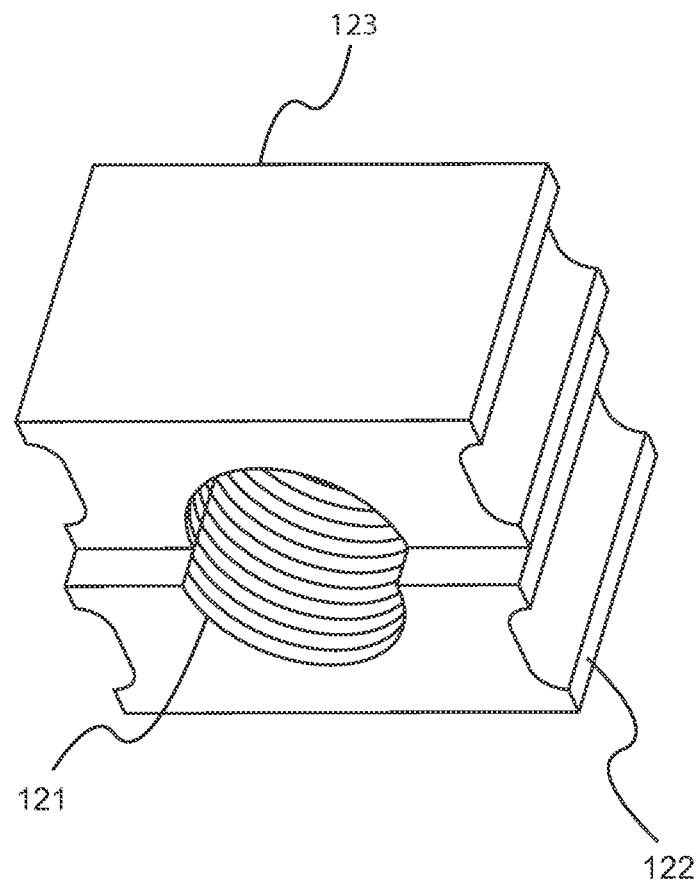
FIG. 12 shows one embodiment of LSS nuts that are split along the longitudinal axis.

FIG. 12 shows another embodiment of an LSS bracket similar to that of FIG. 6. A CDT shaft (not shown) conjugately engages the internal threads in the hole 121 formed by the two LSS bracket subunits 122 and 123. Together, the two brackets 122 and 123 can provide a range of differential axial movement between them from very fine to very coarse depending on thread type. Such an embodiment is quite useful. One example application may be an adjustable platform on an optical bench while other applications enable precise measuring devices similar to micrometers.

Figure 13:
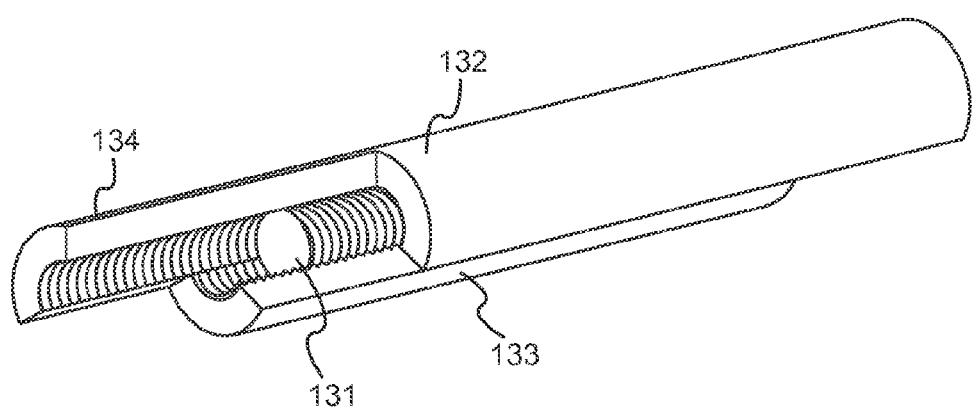
FIG. 13 shows one embodiment of an externally threaded CDT shaft engaged with three internally threaded elongated LSS nuts.

FIG. 13 shows an embodiment where the LSS bracket subunits 132, 133 and 134 are elongated. Earlier embodiments shown LSS brackets of shorter dimension. In some applications, longer LSS brackets are possible. Increasing the length and therefore the number of threads engaged, enables the LSS/CDT combination to exert more force among the members. The CDT shaft 131 turns to move the rotationally restrained LSS bracket subunits 132, 133 and 134 according to their respective thread types.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. An adjustment bracket assembly comprising:
an adjustment shaft, with said shaft having at least first and second external thread paths, with said first thread path being different in configuration from said second thread path;
an adjustment bracket for engagement with said adjustment shaft, with said adjustment bracket comprising having at least first and second internal thread paths for engagement with said first and second thread paths of said adjustment shaft;
wherein rotation of said shaft or bracket in relation to each other results in differential movement of at least two subunits of said shaft or said bracket; wherein said adjustment bracket comprises: a first bracket subunit, said first bracket subunit having said first internal thread path; and a second bracket subunit, said second bracket subunit having said second internal thread path; in which said adjustment shaft comprises a first shaft subunit and a second shaft subunit, with said first shaft subunit having an external thread path configured for engagement with one of said internal thread paths of said bracket, so that when said bracket is rotated in relation to said shaft, said first bracket subunit and said second bracket subunit move differentially in relation to one another.

2. The adjustment bracket assembly of claim 1, wherein when said adjustment shaft is rotated relative to said adjustment bracket, said first bracket subunit, and said second bracket subunit, move differentially in relation to one other, and wherein said first internal thread path differs from said second internal thread path in pitch, one internal thread path being more steeply pitched, and one internal thread path being less steeply pitched by comparison.

3. The adjustment bracket assembly of claim 1 in which rotation of said bracket in relation to said shaft results in said first bracket subunit and said second bracket subunit moving in opposite directions to each other.

4. The adjustment bracket assembly of claim 1 in which rotation of said bracket in relation to said shaft results in said first bracket subunit and said second bracket subunit moving in the same direction as one another, but at different rates.

5. The adjustment bracket assembly of claim 1 in which rotation of said adjustment shaft in relation to said adjustment bracket results in said first bracket subunit and said second bracket subunit moving in opposite directions to each other.

6. The adjustment bracket assembly of claim 1 in which said first external thread path differs from said second external thread path in direction, one external thread path being left handed and one external thread path being right handed.

7. The adjustment bracket assembly of claim 1 in which said first external path differs from said second external thread path in pitch, one external thread path being more steeply pitched and one external thread path being less steeply pitched by comparison.

8. The adjustment bracket assembly of claim 1 in which said first external thread path differs from said second external thread path in direction, one external thread path being left handed and one external thread path being right handed.

9. An adjustment bracket assembly comprising:
an adjustment shaft, said shaft comprising a first shaft subunit with at least a first external thread path, and a second shaft subunit with at least a second external thread path, said first external thread path being different in configuration from said second external thread path; and
an adjustment bracket for engagement with said adjustment shaft, said adjustment bracket comprising a first internal thread path for engagement with said first external thread path, and a second internal thread path for engagement with said second external thread path;
wherein rotation of said adjustment bracket in relation to said adjustment shaft results in differential movement of said first shaft subunit relative to said second shaft subunit.

10. An adjustment bracket assembly comprising:
an adjustment shaft, said shaft comprising a first external thread path and a second external thread path, said first external thread path being different in configuration from said second external thread path; and
an adjustment bracket for engagement with said adjustment shaft, said adjustment bracket comprising a first bracket subunit with at least a first internal thread path for engagement with said first external thread path of said adjustment shaft, and a second bracket subunit with at least a second internal thread path for engagement with said second external thread path of said adjustment shaft;
wherein rotation of said adjustment shaft or said adjustment bracket in relation to each other results in differential movement of said first bracket subunit relative to said second bracket subunit, and wherein said first external path differs from said second external thread path in pitch, one external thread path being more steeply pitched and one external thread path being less steeply pitched by comparison; in which said adjustment shaft comprises a first shaft subunit and a second shaft subunit, with said first shaft subunit having an external thread path configured for engagement with one of said internal thread paths of said bracket, so that when said bracket is rotated in relation to said shaft, said first bracket subunit and said second bracket subunit move differentially in relation to one another.

11. The adjustment bracket assembly of claim 10 in which said first internal thread path differs from said second internal thread path in direction, one internal thread path being left handed and one internal thread path being right handed.

12. The adjustment bracket assembly of claim 10 in which said first internal thread path differs from said second internal thread path in pitch, one internal thread path being more steeply pitched and one internal thread path being less steeply pitched by comparison.

* * * * *